(12) United States Patent
Fujiyama et al.

(10) Patent No.: US 8,443,925 B2
(45) Date of Patent: May 21, 2013

(54) MOTORCYCLE

(75) Inventors: Kotaro Fujiyama, Wako (JP); Hideki Shimizu, Wako (JP); Junichi Sakamoto, Wako (JP); Satoru Ikami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/580,059

(22) PCT Filed: Feb. 23, 2010

(86) PCT No.: PCT/JP2010/001215
§ 371 (c)(1),
(2), (4) Date: Aug. 20, 2012

(87) PCT Pub. No.: WO2011/104749
PCT Pub. Date: Sep. 1, 2011

(65) Prior Publication Data
US 2012/0318598 A1    Dec. 20, 2012

(51) Int. Cl.
*B62D 61/02*    (2006.01)
(52) U.S. Cl.
USPC .......................................................... 180/219
(58) Field of Classification Search
USPC ............... 180/219, 228, 291; 411/150, 371.2, 411/546
See application file for complete search history.

(56) References Cited

U.S. PATENT DOCUMENTS

| | | | |
|---|---|---|---|
| 6,779,620 B2 * | 8/2004 | Taniguchi et al. | 180/219 |
| 7,806,223 B2 * | 10/2010 | Kurokawa et al. | 180/311 |
| 2004/0238254 A1 | 12/2004 | Iwata et al. | |
| 2005/0178596 A1 * | 8/2005 | Brendelson et al. | 180/228 |
| 2008/0202840 A1 * | 8/2008 | Shimozato et al. | 180/291 |
| 2009/0230666 A1 | 9/2009 | Kudo | 280/798 |
| 2010/0044139 A1 * | 2/2010 | Kurokawa et al. | 180/311 |
| 2010/0071647 A1 * | 3/2010 | Okada et al. | 123/90.31 |
| 2010/0207345 A1 * | 8/2010 | Nakagawa et al. | 280/124.109 |
| 2011/0168477 A1 * | 7/2011 | Yokomori et al. | 180/291 |
| 2012/0187654 A1 * | 7/2012 | Kawai | 280/288.4 |
| 2012/0205179 A1 * | 8/2012 | Toda et al. | 180/312 |

FOREIGN PATENT DOCUMENTS

| | | |
|---|---|---|
| JP | 57-110574 A | 7/1982 |
| JP | 62-36990 U | 3/1987 |
| JP | 62-66898 U | 4/1987 |
| JP | 10-236376 A | 9/1998 |
| JP | 2005-14885 A | 1/2005 |

* cited by examiner

*Primary Examiner* — Tashiana Adams
(74) *Attorney, Agent, or Firm* — Birch, Stewart, Kolasch & Birch, LLP

(57) ABSTRACT

The motorcycle comprises a chassis frame (5); an engine (20), a hanger portion (21) suspended from the chassis frame (5); a pair of down tubes (9) extending downward in the fore portion of the chassis frame (5); and an engine hanger bracket (100), further comprising plate portions (101) and collar portions (106) disposed upon the plate portions (101), the engine hanger bracket (100) linked to the pair of down tubes (9) and the hanger portion (21). The motorcycle further comprises an upper suspension portion (112), which suspends the engine (20) by fastening the down tubes (9), the plate portions (101), the collar portions (106), and an upper hanger portion (22), in a state of being positioned in a linear state in the vehicle width direction; and a lower suspension portion (124), which suspends the engine (20) by fastening the plate portions (101) and a lower hanger portion (23).

7 Claims, 8 Drawing Sheets

MOTORCYCLE

TECHNICAL FIELD

The present invention relates to a motorcycle that suspends the engine from the chassis frame.

BACKGROUND ART

A motorcycle has been conventionally known that makes a part of the engine suspended from the chassis frame to fixedly support the engine (e.g., refer to the following Patent Document 1).

This motorcycle described in Patent Document 1 includes down tubes that extend downwards from a head pipe of the chassis frame, a left and right pair of hanger plates that extend rearwards from the down tubes, and collars that extend from a rear end of the hanger plates to the sides of the chassis. The motorcycle described in Patent Document 1 is configured by overlapping, on outer end faces of the collars, front hanger portions of an engine having a cylinder extending in a vertical direction, and then joining the front hanger portions and a rear end of the hanger plates with a bolt penetrating the collars.

Patent Document 1: Japanese Unexamined Patent Application, Publication No. H10-236376

DISCLOSURE OF THE INVENTION

Problems to be Solved by the Invention

However, in the motorcycle described in Patent Document 1, the chassis frame and the engine are fastened using engine hanger brackets consisting of plates and collars to have a plurality of fastening axes. As a result, it has been difficult to make the basic engine greatly contribute to the rigidity of the frame. In addition, to ensure the rigidity of the frame, it is necessary to further raise the rigidity such as by thickening the engine hanger brackets. As a result, there has been a problem in that the weight around the engine increases.

In addition, in the above motorcycle described in Patent Document 1, the weight of the engine is supported through collars and fastening members (bolts). As a result, it is necessary to adequately ensure the strength of the collars and fastening members so as to be able to support the load related to the rigidity of the frame and the load related to the weight of the engine by way of the collars and fastening members. Therefore, there has also been a problem in this regard in that that the weight of the suspension structure of the engine increases.

The present invention has an object of providing a motorcycle that can improve the rigidity of the chassis frame, and achieve a weight reduction in a motorcycle that includes an engine hanger bracket.

Means for Solving the Problems

According to a first aspect of the invention, a motorcycle includes: a chassis frame; an engine having a hanger portion that is suspended from the chassis frame; a pair of down tubes in a vehicle width direction that forms a part of the chassis frame, and extends downwards at a front portion of the chassis frame; and an engine hanger bracket having a plate portion formed in a plate shape and a collar portion provided to the plate portion, and joining the pair of down tubes with the hanger portion, in which the hanger portion includes an upper hanger portion and a lower hanger portion that are respectively disposed one above the other in a height direction of the engine, and the motorcycle further including: an upper suspension portion that suspends the engine by way of fastening the down tube, the plate portion, the collar portion and the upper hanger portion in a state arranged linearly in a vehicle width direction; and a lower suspension portion that suspends the engine by way of fastening the plate portion and the lower hanger portion.

According to a second aspect of the invention, in the configuration as described in the first aspect, the upper suspension portion includes: a boss portion provided at the down tube; the plate portion abutting the boss portion; the collar portion fixed to the plate portion; the upper hanger portion abutting the collar portion; and an upper fastening member that is disposed to penetrate the pair of down tubes, the boss portion, the plate portion, the collar portion and the upper hanger portion in a vehicle width direction, and is configured to be fastenable from outside of the pair of down tubes.

According to a third aspect of the invention, the configuration as described in the first or second aspect further includes a head pipe that forms a part of the chassis frame, and retains a steering device of a front wheel to be rotatable, in which the down tube extends downwards linearly from the head pipe, and the upper suspension portion and the lower suspension portion are disposed linearly along a direction in which the down tube extends.

According to a fourth aspect of the invention, in the configuration as described in any one of the first to third aspects, a fastening portion to fasten the plate portion and the down tube is provided above the upper suspension portion.

According to a fifth aspect of the invention, in the configuration as described in any one of the first to fourth aspects, a cover-member fastening stay to fasten a cover member that covers a lateral side of a chassis is provided between the fastening portion of the plate portion and the upper suspension portion.

According to a sixth aspect of the invention, the configuration as described in any one of the first to fifth aspects further includes a rear suspension portion that suspends the engine, by way of fastening a rear portion of the engine having a crankshaft extending in the vehicle width direction, and an engine hanger stay that is provided at a substantially central part of the chassis frame in a front-rear direction and supports the rear portion of the engine, in which the upper suspension portion and the lower suspension portion are respectively disposed above and below the crankshaft in a side view, and the crankshaft is disposed within a region of triangular shape formed by linking the upper suspension portion, the lower suspension portion, and the rear suspension portion in a side view.

According to a seventh aspect of the invention, in the configuration as described in any one of the first to sixth aspects, a part of the plate portion between the upper suspension portion and the lower suspension portion bends so as to project forwards relative to a line linking the upper suspension portion and the lower suspension portion in a side view.

Effects of the Invention

According to the first aspect of the invention, the upper suspension portion suspends the engine by way of fastening the down tubes, plate portions, collar portions and upper hanger portion in a state arranged linearly in the vehicle width direction. As a result, it is possible to raise the rigidity (lateral stiffness) of the chassis frame in the vehicle width direction. In addition, the lower suspension portion suspends the engine by way of directly fastening the plate portions and lower hanger portion. As a result, it is possible to directly support the weight of the engine, whereby the support stiffness of the engine can be raised. Therefore, it is possible to achieve a weight reduction in a motorcycle that includes an engine hanger bracket, by improving the rigidity of the chassis frame and the support stiffness of the engine by distributing with the upper suspension portion and the lower suspension portion. In addition, since the components of the lower suspension portion are few compared to the upper suspension portion, it is possible to configure the vehicle width to be compact. As a result, it is possible to reduce the weight of a lower portion of the engine, whereby centralization of the mass can be achieved.

According to the second aspect of the invention, the boss portions, plate portions, collar portions and upper hanger portion can be fastened between the pair of down tubes from outside of the down tubes by way of the upper fastening portion. As a result, the engine serving as a rigid member can be configured to be interposed by the down tubes, which are a part of the chassis frame. Therefore, the rigidity of the engine can be effectively used in the improvement of the rigidity of the chassis frame.

According to the third aspect of the invention, the upper suspension portion and lower suspension portion are disposed linearly along the direction in which the down tube extends in a side view. As a result, it is possible to group the load direction upon supporting the engine by the upper suspension portion and the lower suspension portion into the direction in which the down tube extends. Therefore, it is possible to improve the rigidity balance of the chassis frame, whereby the load of the engine can be supported with a light-weight structure.

According to the fourth aspect of the invention, the rotational load applied to the plate portion about the upper suspension portion can be received by the fastening portion. As a result, the support stiffness of the engine can be further raised.

According to the fifth aspect of the invention, the cover-member fastening stay to fasten the cover member covering a lateral side of the chassis is provided between the fastening portion of the plate portion and the upper suspension portion. As a result, it is possible to raise the mounting strength of the cover member.

According to the sixth aspect of the invention, it is possible to appropriately set the support load of the engine at the upper suspension portion, the lower suspension portion and the rear suspension portion, by arranging the upper suspension portion, the lower suspension portion and the rear suspension portion with reference to the crankshaft, which is heavy among the components of the engine. As a result, optimization of the suspension positions of the engine can be achieved, whereby it is possible to achieve a weight reduction in each of the suspension portions and the chassis frame. In addition, the engine can be made to contribute to an improvement in the rigidity of the chassis frame.

According to the seventh aspect of the invention, the main load acting on the lower suspension portion is the tensile force from the weight of the engine. As a result, the plate portion can sufficiently exhibit a function for raising the support stiffness of the engine, even if a part thereof between the upper suspension portion and the lower suspension portion is bent. Therefore, it is possible to achieve a size reduction by bending a part of the plate portion between the upper suspension portion and lower suspension portion thereof to curb the projecting amount to match the shape of the engine.

Figure 1:
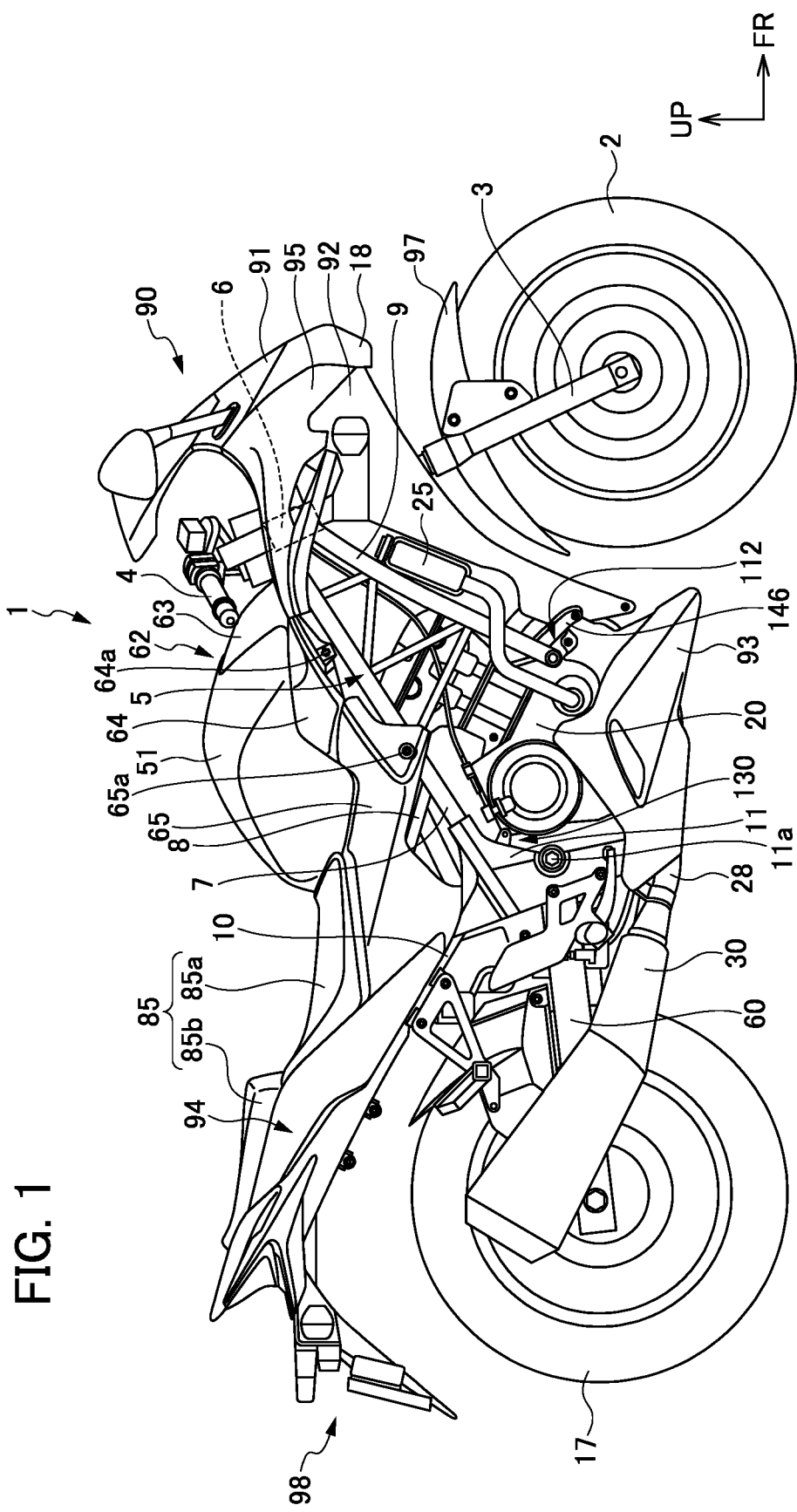
FIG. 1 is a right-side view showing a motorcycle of an embodiment of the present invention.

EXPLANATION OF REFERENCE NUMERALS 1 motorcycle
2 front wheel
3 front fork (steering device)
4 handlebars (steering device)
5 chassis frame
6 head pipe
9 down tube
20 engine
21 hanger portion
22 upper hanger portion
23 lower hanger portion
26 crankshaft
92 inner cowl (cover member)
96 first front-side cowl (cover member)
101 plate portion
106 collar portion
112 upper suspension portion
114 upper hanger bolt (upper fastening member)
118 fastening bolt (fastening portion)
118a nut (fastening portion)
124 lower suspension portion
130 rear suspension portion
130a rear-upper engine suspension portion (rear suspension portion)
132 engine-hanger upper stay (engine-hanger stay)
135 region
135a line
141 first boss portion (boss)
142 second boss portion (boss)
146 cover-member fastening stay

PREFERRED MODE FOR CARRYING OUT THE INVENTION

Figure 2:
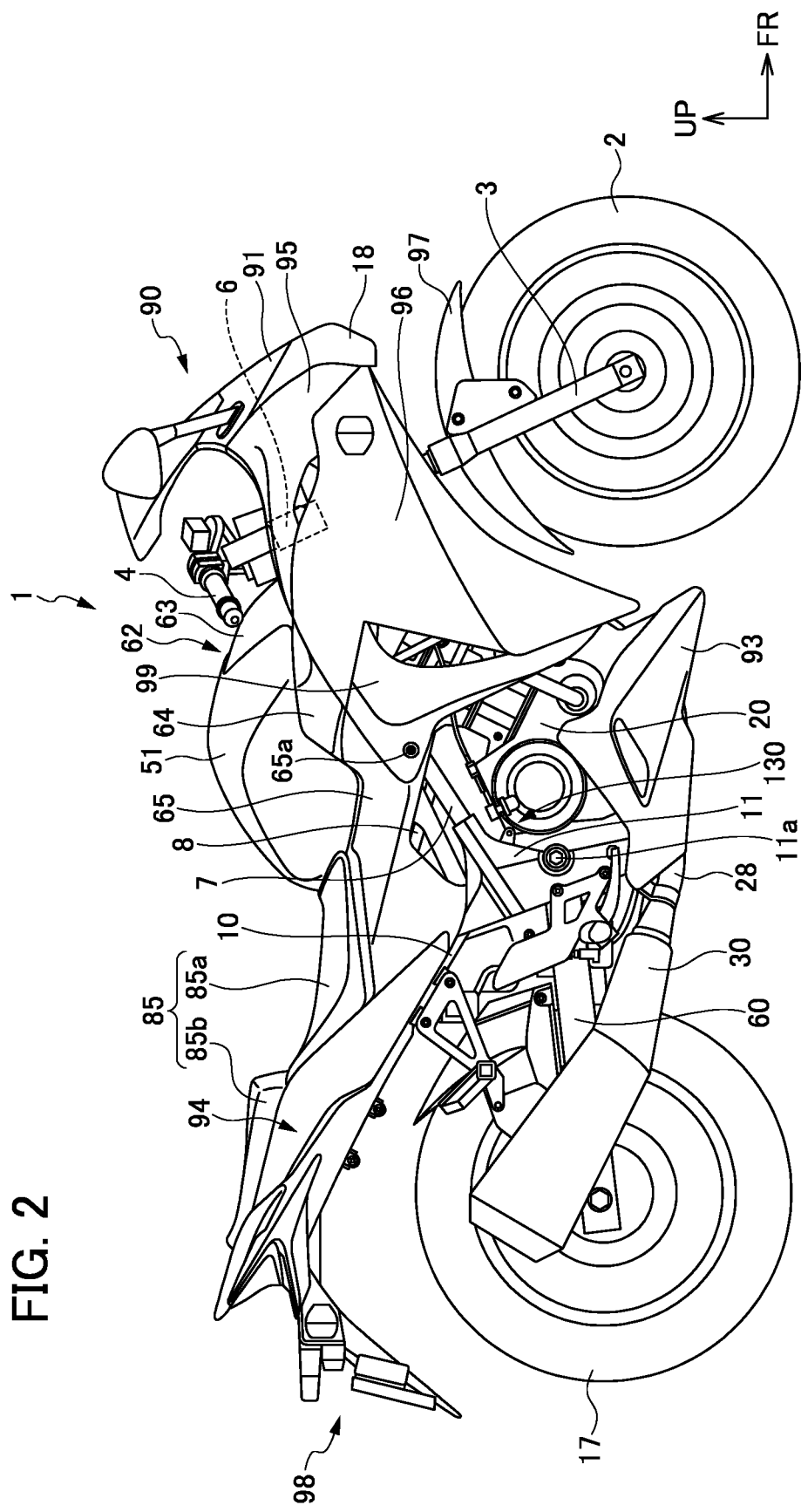
FIG. 2 is a right-side view showing a motorcycle of an embodiment of the present invention.

Hereinafter, an embodiment of the present invention will be explained while referencing the drawings. FIGS. 1 and 2 are right-side views showing a motorcycle of an embodiment of the present invention. In FIG. 1, a state in which one cover member has been removed is shown. FIG. 2 shows a state in which all cover members are mounted to the body. It should be noted that descriptions of front-rear, left-right and upper-lower in the following explanation are in accordance with the directions viewed from rider (driver) riding on the motorcycle, unless particularly specified. In addition, the arrow FR in the drawings indicates ahead of the vehicle, the arrow LH indicates left of the vehicle, and the arrow UP indicates above the vehicle.

First, the overall configuration of a motorcycle 1 of the present embodiment will be explained while referencing FIG. 1. As shown in FIG. 1, the motorcycle 1 of the present embodiment is mainly configured with a chassis frame 5; a front wheel 2; front forks 3 as a steering device pivotally supporting the front wheel 2; handlebars 4 as a steering device joined to the front forks 3; an engine 20 that is supported from the chassis frame 5; a rear wheel 17 that is a drive wheel; a swing arm 60 that is mounted through a rear cushion (not illustrated) to the chassis frame 5 to freely swing up and down, and that pivotally supports the rear wheel 17; pivot plates 11 having a pivot portion 11a joining the swing arm 60 to the chassis frame 5 to freely swing up and down; a fuel tank 51; a seat 85 for rider seating; a head light 18; a body cover 90; a front fender 97; a rear fender 98; a tank cover 62 that covers part of the fuel tank 51; and parts for suspending the engine 20 to the chassis frame 5. The tank cover 62 includes a front tank cover 63 that covers a front part of the fuel tank 51, and a front tank side cover 64 and side cover 65 that cover parts of the lateral sides of the fuel tank 51 in the vehicle width direction. The parts for suspending the engine 20 to the chassis frame 5 include an engine hanger bracket 100, an upper suspension portion 112, a lower suspension portion 124, a rear-upper engine suspension portion 130a, and a rear-lower engine suspension portion 130b.

The chassis frame 5 is configured by a plurality of types of steel stock being integrally joined by welding or the like. As shown in FIG. 1, the chassis frame 5 includes a head pipe 6, main frames 7, seat rails 8, down tubes 9, rear stays 10, and a plurality of cross-members (not illustrated).

The head pipe 6 is disposed at a front-end of the chassis frame 5. The head pipe 6 supports a pair of the front forks 3 pivotally supporting the front wheel 2. The main frames 7 are provided as a pair on the left and right. The pair of main frames 7 extends obliquely downwards to the rear from the head pipe 6 in a side view. Lower ends of the pair of main frames 7 are joined to the pivot plates 11.

The seat rails 8 are provided as a pair on the left and right. In a side view, the pair of seat rails 8 at an end side thereof is joined to the main frames 7. The other end sides of the seat rail 8 extend obliquely upwards to the rear, forming a relatively steep incline.

A pair of the down tubes 9 extends obliquely downwards to the rear from the head pipe 6, in a side view. Details of the down tubes 9 will be described later.

The rear stays 10 are provided as a pair of left and right. The pair of rear stays 10 is joined at an end side to the rear end of the pair of pivot plates 11. The other end sides of the rear stays 10 extend obliquely upwards to the rear, forming a relatively steep incline, and are joined to the rear portion of the pair of seat rails 8.

The cross-members (not illustrated) are constituted of, for example, pipe members extending in the left-right direction, and join the left and right pair of frames (main frames 7, down tubes 9, seat rails 8, etc) in the left-right direction. A cross-member 9a of the down tubes 9 will be described later.

The front forks 3 are provided as a pair of left and right. The upper ends of the pair of front forks 3 are joined to the lower ends of the handlebars 4. The upper ends of the pair of front forks 3 are supported by a steering stem (not illustrated) that is pivotally supported to be freely rotatable to the head pipe 6, and a bridge (not illustrated) that is fixed to the lower and upper ends of this steering stem. The lower ends of the pair of front forks 3 pivotally support the front wheel 2 to be rotatable.

The head light 18 is disposed in front of the head pipe 6 and above the front fender 97, and illuminates in front of the chassis. The head light 18 is fixed to a head-light support stay (not illustrated), which is fixed to the chassis frame 5.

The engine 20 is the motor of the motorcycle 1 (e.g., four-cycle single cylinder water-cooled engine), and is installed at substantially a central part of the chassis frame 5 in the front-back direction, as shown in FIG. 1. The engine 20 is arranged so as to have a crankshaft 26 follow the left-right direction of the chassis. A water-cooling radiator 25 to cool the engine 20, and an exhaust pipe 28 to discharge exhaust gas are connected to the engine 20. A muffler 30 for silencing the exhaust note is connected to the tail end of the exhaust pipe 28.

Details of the engine hanger bracket 100, upper suspension portion 112, lower suspension portion 124, rear-upper engine suspension portion 130a, rear-lower engine suspension portion 130b, etc. for suspending the engine 20 will be described later.

As shown in FIG. 1, the fuel tank 51 stores fuel to be supplied to the engine 20. The fuel tank 51 is disposed behind the head pipe 6 and in front of the seat 85, and is fixed to an upper portion of the chassis frame 5 (main frames 7 and seat frames 8).

The seat 85 for rider seating consists of a main seat 85a on which a driver sits, and a pillion 85b on which a rear passenger sits. The seat 85 for rider seating is supported at an upper portion of the pair of seat rails 8.

Next, the body cover 90 will be explained while referencing FIGS. 1 and 2. The body cover 90 covers the chassis frame 5. The body cover 90 includes a front-center upper cover 91, front-upper side covers 95, an inner cowl 92 as a cover member, first front-side cowls 96 as cover members, second front-side cowls 99, an under cowl 93, and a rear cowl 94.

As shown in FIGS. 1 and 2, the front-center upper cover 91 is disposed above the head light 18 and ahead of the head pipe 6, and is fastened to the front-upper side cover 95 (described later).

The front-upper side covers 95 are provided as a pair of left and right, and are disposed on lateral portions of the head light 18, as shown in FIGS. 1 and 2. More specifically, the front-upper side covers 95 are disposed between the head light 18 and the fuel tank 51 in a side view, and cover the head pipe 6 from the side. The front-upper side covers 95 are formed in a substantially triangular shape that narrows from the front towards the rear in a side view. The front-upper side covers 95 are fastened at front portions thereof to the head light 18 or head-light support stays (not illustrated). Lower ends of the front-upper side covers 95 are locked to the first front-side cowls 96.

The first front-side cowls 96 are provided as a pair of left and right, and are disposed at a lower portion of the front-upper side cowls 95, as shown in FIG. 2. The first front-side cowls 96 are disposed so as to cover lateral sides of the chassis frame 5 and the engine 20. The first front-side cowls 96 are formed in a substantially triangular shape that narrows from the rear towards the front in a side view, and are made in a shape having a portion at a rear end cut out in a substantially triangular shape.

As shown in FIG. 2, the first front-side cowls 96 are locked at upper portions thereof to lower portions of the front-upper side covers 95, and at lower portions thereof are fastened to the chassis frame 5 through cover-member fastening stays 146 (refer to FIG. 1). Rear portions of the first front-side cowls 96 are fastened to the second front-side cowls 99.

In addition, locking projections (not illustrated) are provided to an upper portion of the first front-side cowls 96 on an inner face at a rear end. By inserting this locking projection through a resin clip (not illustrated) into a locking portion 64a (refer to FIGS. 1 and 6) provided at a rear-lower end side of the front tank side cover 64, the first front-side cowl 96 is locked to the front tank side cover 64.

The second front-side cowls 99 are provided as a pair of left and right, joined behind the first front-side cowls 96, and disposed so as to cover lateral sides of the chassis frame 5 and engine 20, as shown in FIG. 2. The second front-side cowls 99 are formed in a substantially L shape in a side view. The second front-side cowls 99 are joined at one end thereof to cut-out lower edges of the upper portions of the first front-side cowls 96, and are joined at the other end thereof to lower portions of the first front-side cowls 96.

More specifically, the second front-side cowls 99 are joined to the first front-side cowls 96 by making a cowl matching surface thereof (not illustrated) and a cowl matching surface (not illustrated) of the first front-side cowl 96 overlap, and fastening this overlapping portion with fastening members (not illustrated). The second front-side cowls 99 integrated with the first front-side cowls 96 are tightened and fixed with side covers 65 at fastening portions 65a (refer to FIGS. 1 and 2) located substantially in the center of the main frames 7 in the front-rear direction.

The inner cowl 92 (refer to FIGS. 1 and 3) is disposed at inner sides in the vehicle width direction of the first front-side cowls 96, and is fixed to the first front-side cowls 96. An upper portion of the inner cowl 92 is locked to a lower portion of the front-upper side covers 95. A lower portion of the inner cowl 92 is fastened to a cover-member fastening stays 146 (refer to FIGS. 1 and 3).

The under cowl 93 covers the exhaust pipe 28 (refer to FIG. 5) located below the engine 20 from both sides of the chassis, as shown in FIG. 2. The under cowl 93 is formed in a substantially triangular shape widening from the front to towards the rear in a side view. An upper portion of the under cowl 93 on a front side is fastened to the cover-member fastening stays 146 (refer to FIGS. 1, 3 and 4). A rear portion of the under cowl 93 is fastened to a rear portion of the chassis frame 5.

The rear cowl 94 is configured from a plurality of cover members, and covers rear portions of the seat rails 8 and rear portions of the rear stays 10. In a side view, the rear cowl 94 extends so as to widen from substantially the center of the chassis towards the pillion 85b, and is formed so as to narrow to the rear and upwards.

The front fender 97 is fixed to the front forks 3, and covers above the front wheel 2. The rear fender 98 is fixed to the seat rails 8, and covers above the rear wheel 17 from behind.

Figure 3:
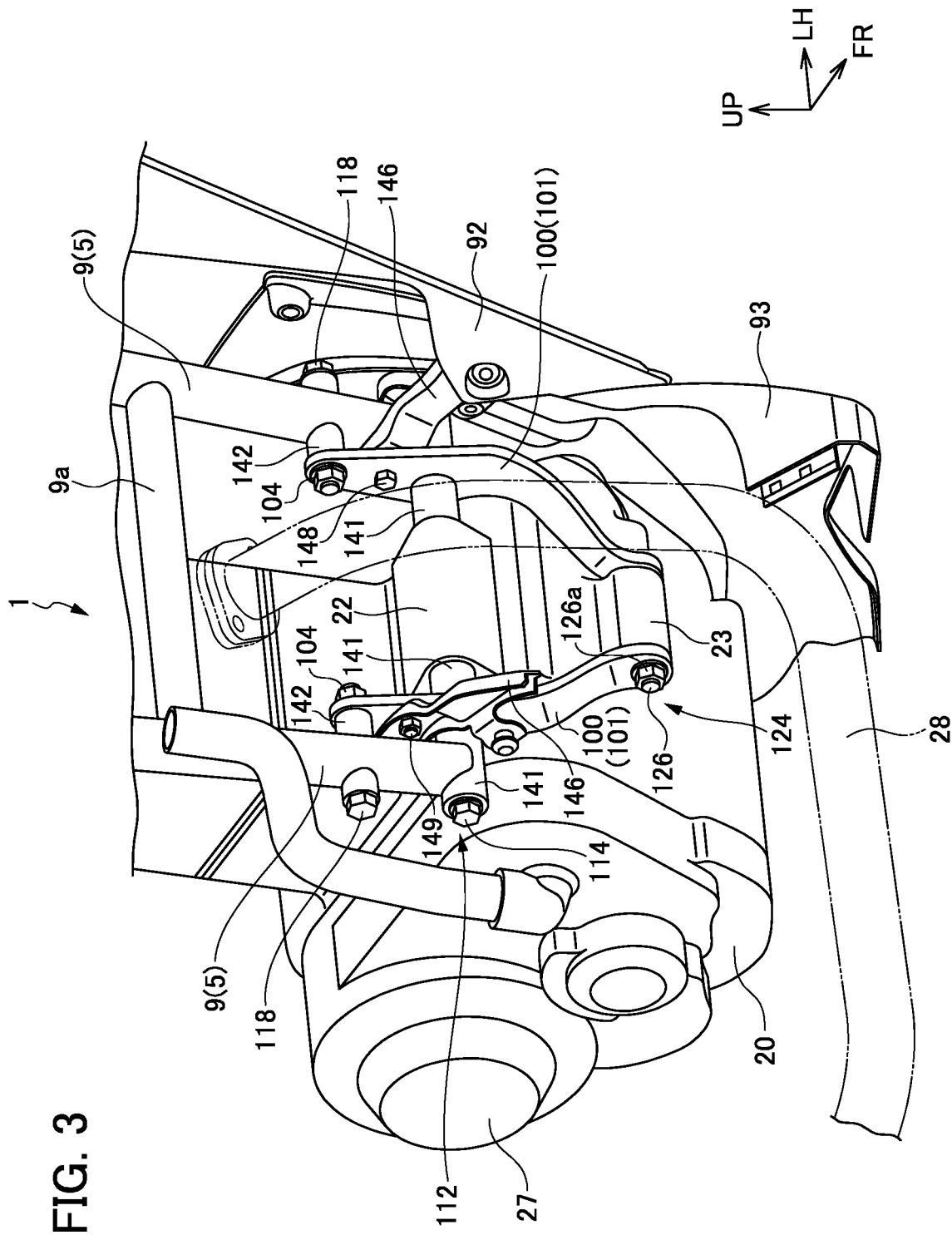
FIG. 3 is a perspective view showing a suspension structure of an engine.
Figure 4:
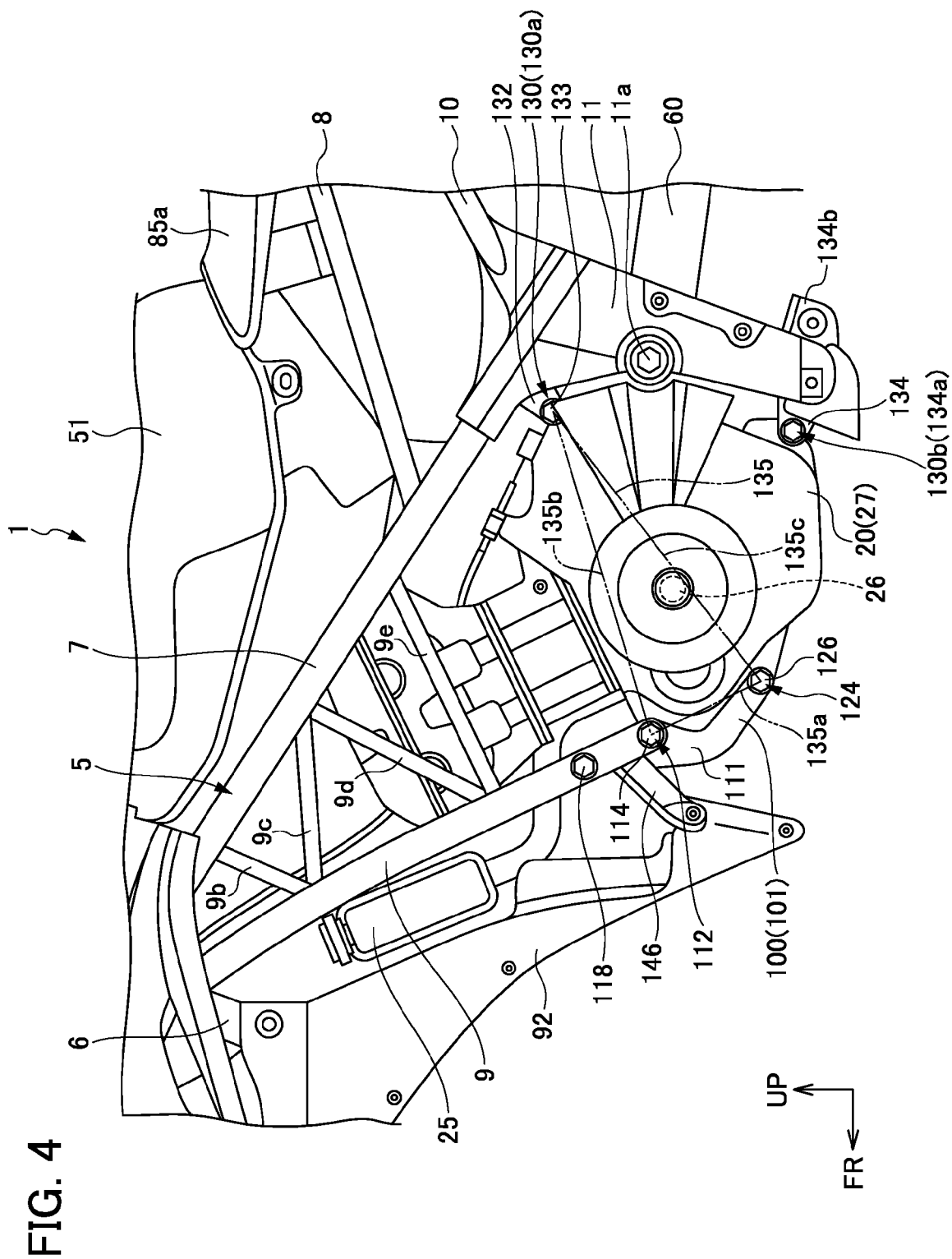
FIG. 4 is a left-side view showing the suspension structure of the engine.
Figure 5:
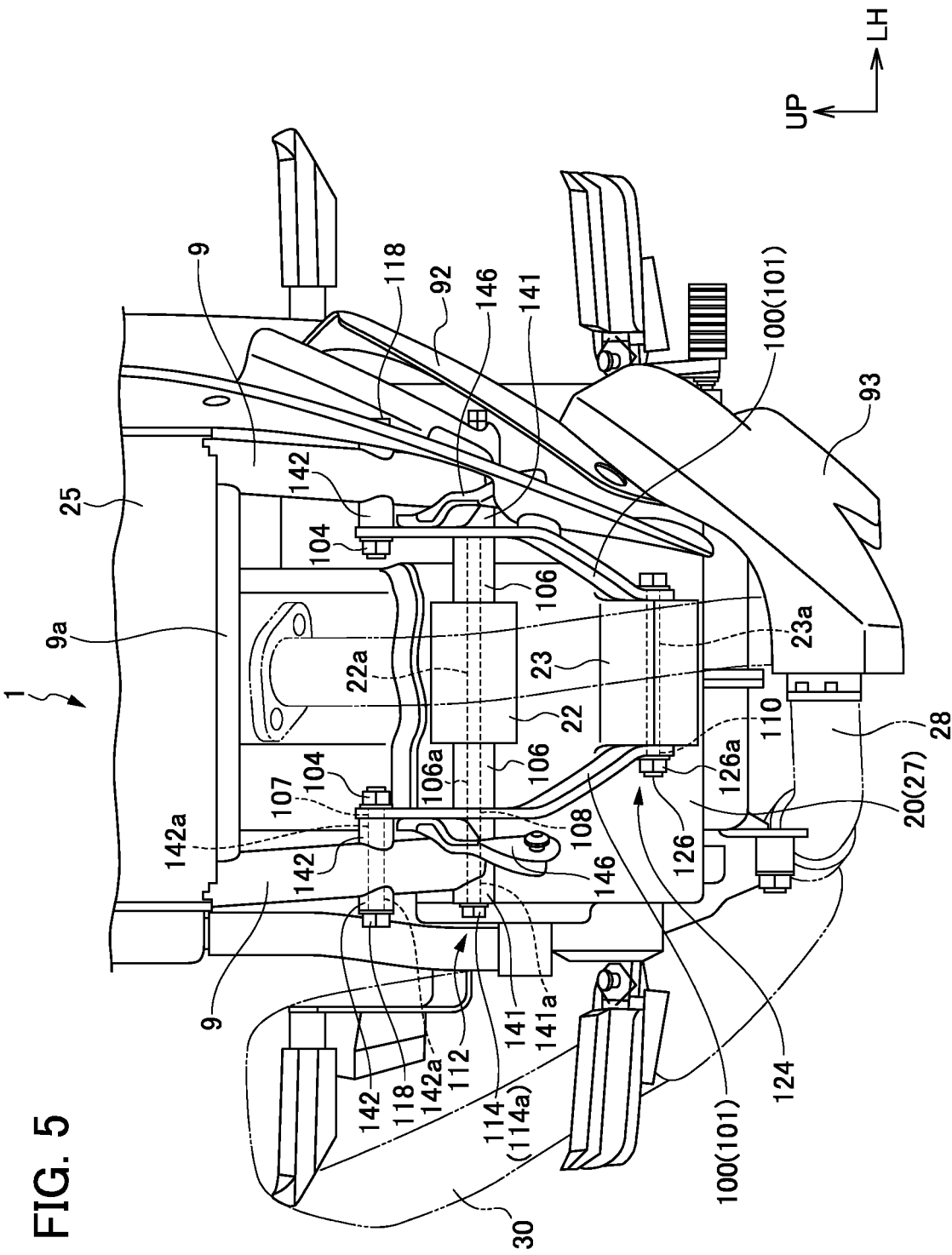
FIG. 5 is a front view showing the suspension structure of the engine.
Figure 6:
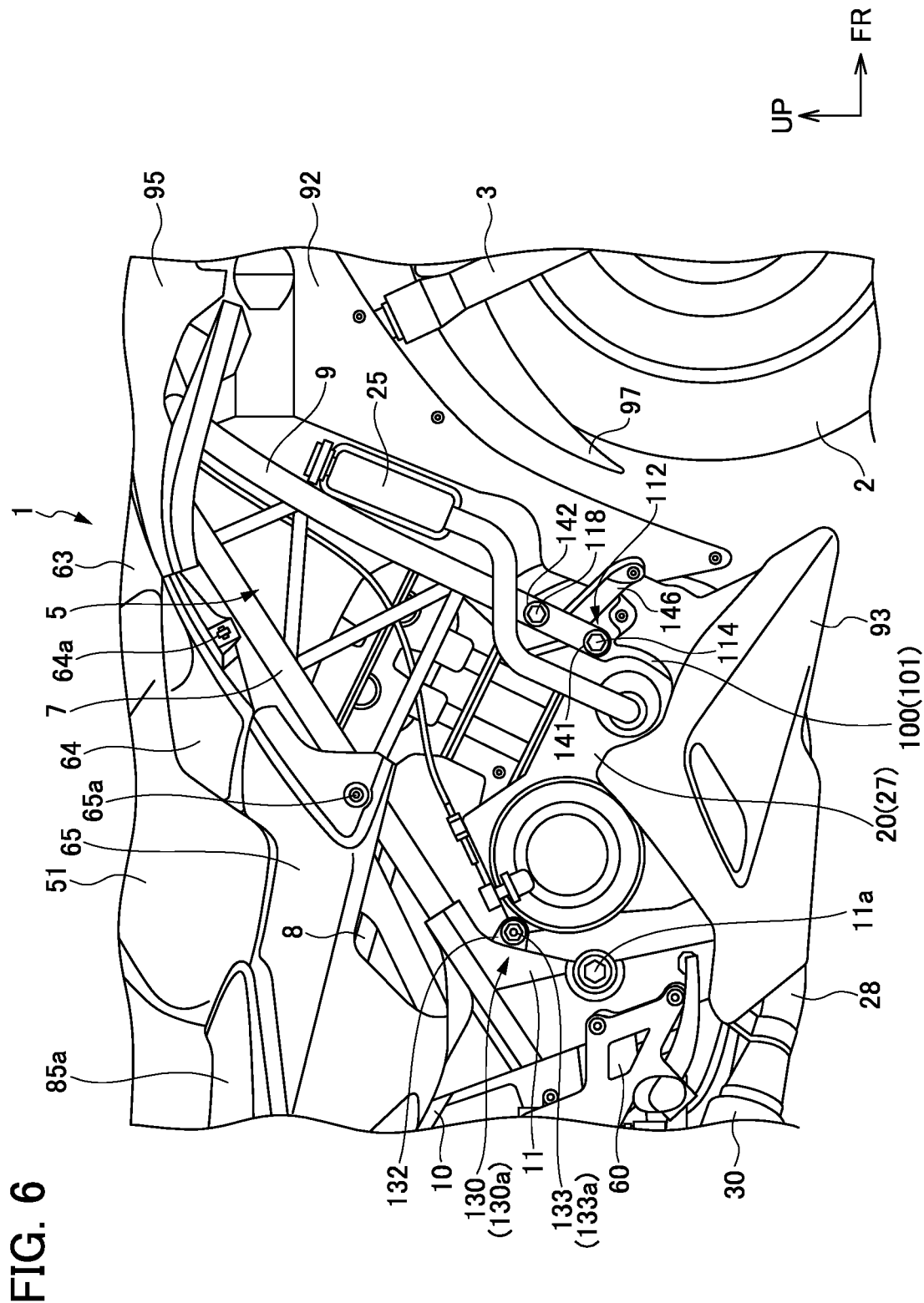
FIG. 6 is a right-side view showing the suspension structure of the engine.
Figure 7:
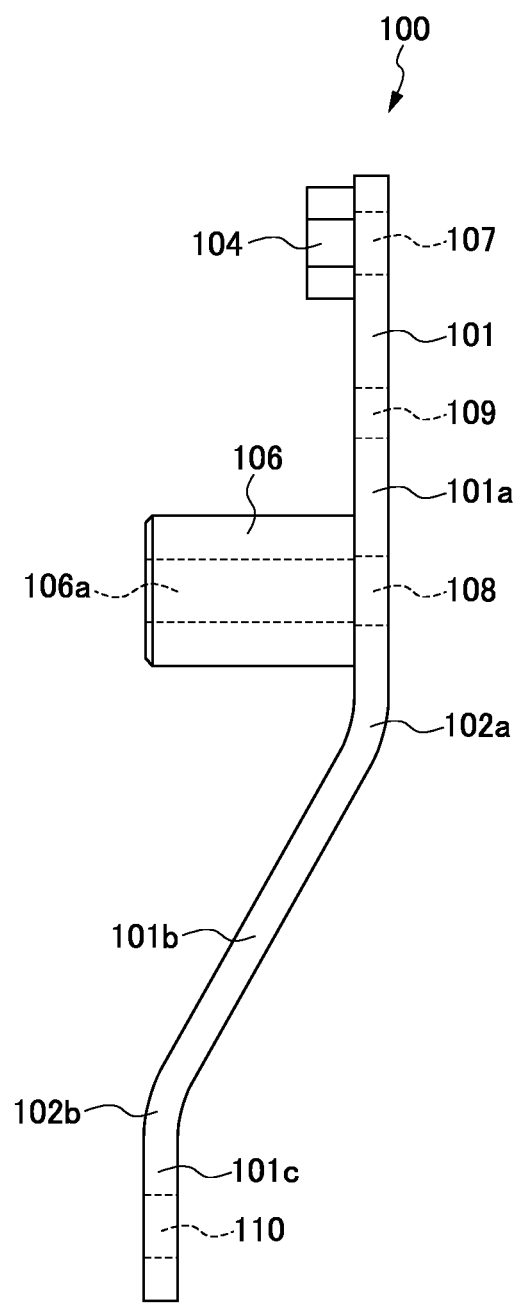
FIG. 7 is a front elevation view showing an engine hanger bracket.
Figure 8:
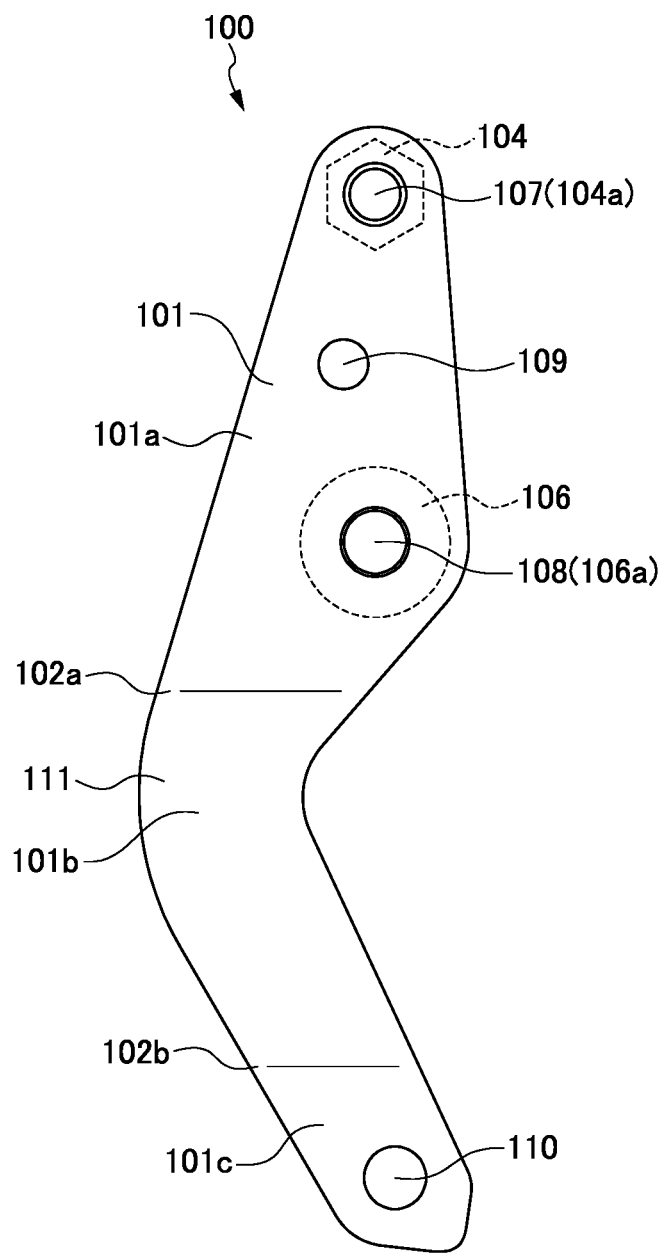
FIG. 8 is a side view showing the engine hanger bracket.

Next, the suspension structure of the engine 20 of the motorcycle 1, which is a characteristic part of the present embodiment, will be specifically explained while referencing FIGS. 3 to 8. FIG. 3 is a perspective view showing the suspension structure of the engine. FIG. 4 is a left side view showing the suspension structure of the engine. FIG. 5 is a front view showing the suspension structure of the engine. FIG. 6 is a right side view showing the suspension structure of the engine. FIG. 7 is a front elevation view showing the engine hanger bracket. FIG. 8 is a side view showing the engine hanger bracket.

As shown in FIGS. 3 to 6, the motorcycle 1 of the present embodiment includes the chassis frame 5, the engine 20 having hanger portions 21 suspended from the chassis frame 5, the pair of down tubes 9 in the vehicle width direction, the engine hanger brackets 100 joining the pair of down tubes 9 and the hanger portions 21, and suspension portions suspending the engine 20. The suspension portions include the upper suspension portion 112, the lower suspension portion 124, the rear-upper engine suspension portion 130a, and the rear-lower engine suspension portion 130b.

First, the configuration of the engine 20 will be explained. As shown in FIGS. 3 to 6, the engine 20 includes a crankcase 27 accommodating the crankshaft 26, etc. The hanger portion 21 suspended from the chassis frame 5 (down tubes 9) is provided at a front portion of this crankcase 27. As shown in FIGS. 3 and 5, the hanger portion 21 consists of an upper hanger portion 22 and a lower hanger portion 23 that are disposed one above the other in the height direction of the engine 20 (crankcase 27).

The upper hanger portion 22 and lower hanger portion 23 project forwards in a substantially semicircular shape in a side view. A through hole 22a for inserting an upper hanger bolt 114 (described later) in the vehicle width direction is provided in the upper hanger portion 22. A through hole 23a for inserting a lower hanger bolt 126 (described later) in the vehicle width direction is provided in the lower hanger portion 23.

A through hole (not illustrated) is provided in an upper portion of the rear portion of the engine 20. A fastening bolt 133 (refer to FIGS. 4 and 6) is inserted in this through hole. This through hole constitutes a rear-upper engine suspension portion 130a (rear suspension portion 130 described later).

In addition, a through hole (not illustrated) is provided in a lower portion of the rear portion of the engine 20. A fastening bolt 134a (refer to FIG. 4) is inserted in this through hole. This through hole constitutes a rear-lower engine suspension portion 130b.

Next, characteristic parts of the chassis frame 5 suspending the engine 20 will be explained in further detail while referencing FIGS. 3 to 6. As shown in FIG. 4, the chassis frame 5 includes the head pipe 6, left and right pair of main frames 7, left and right pair of seat rails 8, left and right pair of down tubes 9, left and right pair of rear stays 10, a plurality of cross-members (not illustrated except for cross-member 9a (refer to FIG. 5)), left and right pair of pivot plates 11, left and right pair of engine-hanger upper stays 132 that suspends an upper part of the rear portion of the engine 20, and left and right pair of engine-hanger lower stays 134 that suspends a lower part of the rear portion of the engine 20.

The pair of down tubes 9 forms a portion of the chassis frame 5, and extends downwards at a front portion of the chassis frame 5. The pair of down tubes 9 is joined by the cross-member 9a, which extends in the left-right direction at a middle location in the vertical direction, as shown in FIGS. 3 and 5.

In addition, as shown in FIG. 4, the down tubes 9 are joined by the main frames 7 and a plurality of subframes 9b, 9c, 9d and 9e, in a side view. The subframes 9b, 9c, 9d and 9e are provided between the down tubes 9 and main frames 7, and form a trellis structure. In other words, the subframes 9b, 9c, 9d and 9e strengthen the longitudinal stiffness of the chassis frame 5. The down tubes 9 are made from steel tubes having a circular cross section, for example.

The down tubes 9 have a first boss portion (boss portion) 141, and a second boss portion 142, as shown in FIGS. 3 and 5. The first boss portion 141 is a cylindrical member extending from a lower end of the down tube 9 to the inside and outside in the vehicle width direction. The first boss portion 141 has, on a central axis thereof, a through hole 141a into which the upper hanger bolt 114 (described later) is inserted. The second boss portion 142 is disposed to be separated above the first boss portion 141, and is a cylindrical member that is provided below the cross member 9a, and extends from the down tube 9 in the vehicle width direction. The second boss portion 142 has, on a central axis thereof, a through hole 142a into which the fastening bolt 118 (described later) is inserted.

The pair of pivot plates 11 is provided at substantially the center of the chassis frame 5 in the front-rear direction, as shown in FIGS. 1 and 4. Upper portions of the pair of pivot plates 11 are joined by way of an upper cross-member (not illustrated) that extends in the vehicle width direction. In addition, lower portions of the pair of pivot plates 11 are joined by way of a lower cross-member (not illustrated) that extends in the vehicle width direction.

As shown in FIG. 4, the engine-hanger upper stays 132 are formed in a plate shape. The engine-hanger upper stays 132 are formed so as to extend forwards from the upper cross-member. A through hole (not illustrated) into which the fastening bolt 133 is inserted is provided in the engine-hanger upper stay 132.

An upper part of the rear portion of the engine 20 is fastened to the chassis frame 5 at the engine-hanger upper stays 132, by way of the fastening bolt 133 and a nut 133a (refer to FIG. 6) threading to the fastening bolt 133. The engine-hanger upper stays 132, fastening bolt 133 and nut 133a constitute the rear-upper engine suspension portion 130a (rear suspension portion 130 described later).

As shown in FIG. 4, the engine-hanger lower stay 134 is formed in a plate shape. The engine-hanger lower stay 134 is formed so as to extend forwards from the lower cross-member. A through hole (not illustrated) into which a fastening bolt 134a is inserted is provided in the engine-hanger lower stay 134.

As shown in FIG. 4, a lower part of the rear portion of the engine 20 is fastened to the chassis frame 5 at the engine-hanger lower stays 134 by way of the fastening bolt 134a and a nut (not illustrated) threading to this fastening bolt 134a. The engine-hanger lower stays 134, fastening bolt 134a and the nut threading to this fastening bolt 134a constitute the rear-lower engine suspension portion 130b.

It should be noted that support stay 134b (refer to FIG. 4) is extended rearwards at the lower cross-member. This support stay 134b supports the link mechanism of the rear cushion, which is not illustrated.

Next, the engine hanger brackets 100 will be explained while referencing FIGS. 3 to 8. The engine hanger brackets 100 are equipped as a pair in the vehicle width direction of the motorcycle 1. FIGS. 7 and 8 show the engine hanger bracket 100 that is disposed on the left side of the motorcycle 1 in the vehicle width direction. In the following explanation, this engine hanger bracket 100 disposed on the left side in the vehicle width direction will mainly be explained.

As shown in FIGS. 7 and 8, the engine hanger bracket 100 includes a plate portion 101 formed in a plate shape, a welded nut 104 fixed to the plate portion 101, and a collar portion 106 fixed to the plate portion 101. The engine hanger bracket 100 is made from steel, for example.

As shown in FIGS. 7 and 8, the plate portion 101 is integrally configured from a first plate part 101a, second plate part 101b, and third plate part 101c. As shown in FIG. 8, the plate portion 101 makes a substantially wide-V shape in a side view, and has a bent part 111 that bends and projects forwards. The bent part 111 is formed between a through hole 108 (described later) and through hole 110 (described later) of the plate portion 101 to bend so as to project forwards.

A first folded part 102a is formed at a border of the first plate part 101a and the second plate part 101b. A second folded part 102b is formed at a border of the second plate part 101b and the third plate part 101c. The plate portion 101 is folded at the first folding part 102a and second folding part 102b.

More specifically, as shown in FIG. 7, the second plate part 101b extends from a lower end (first folding part 102a) of the first plate part 101a downwards in a front elevation view, and slopes to the right in the vehicle width direction. The third plate part 101c extends from the lower end (second folding part 102b) of the second plate part 101b downwards in a front elevation view. The first plate part 101a and third plate part 101c are disposed in parallel in a front elevation view.

The welded nut 104 having a threaded hole 104a, and the cylindrical collar portion 106 are provided on a face on the right side of the first plate part 101a in the vehicle width direction. The welded nut 104 is fixed by welding to an upper portion of the first plate portion 101a. In the first plate part 101a, a through hole 107 is provided concentrically with the welded nut 104 at the location at which the welded nut 104 is fixed.

The collar portion 106 is fixed by welding to the lower portion of the first plate part 101a. In the first plate part 101a, a through hole 108 is provided concentrically with the through hole 106a of the collar portion 106, at the location at which the collar portion 106 is fixed. The upper hanger bolt 114 is inserted into the through hole 108.

In addition, a through hole 109 is provided in the first plate part 101a between the welded nut 104 and the collar portion 106. A bolt 148 (refer to FIG. 3) for fixing the cover-member fastening stay 146 (described later) is inserted in the through hole 109.

A through hole 110 is provided in the third plate part 101c. A lower hanger bolt 126 is inserted in the through hole 110.

The engine hanger bracket 100 disposed on the left side of the motorcycle 1 in the vehicle width direction has been explained in the foregoing. Since the configuration of the engine hanger bracket 100 disposed on the right side of the motorcycle 1 in the vehicle width direction is substantially the same as the configuration of the above-mentioned engine hanger bracket 100 disposed on the left side in the vehicle width direction, otherwise redundant explanations will be omitted.

Next, the upper suspension portion 112 and the lower suspension portion 124 will be explained while referencing FIGS. 3 to 6.

As shown in FIGS. 3 to 6, the upper suspension portion 112 suspends the engine 20 by fastening the down tubes 9, plate portions 101, collar portions 106 and upper hanger portion 22 in a state arranged linearly in the vehicle width direction.

More specifically, the upper suspension portion 112 includes first boss portions 141 and second boss portions 142 provided to the down tubes 9, the plate portions 101 abutting the first boss portions 141 and second boss portions 142, the collar portions 106 fixed to the plate portions 101, the upper hanger portion 22 abutting the collar portions 106, the upper hanger bolt 114 as an upper fastening member, and the nut 114a threading to the upper hanger bolt 114. The upper hanger bolt 114 is arranged to penetrate in the vehicle width direction through the pair of down tubes 9, first boss portion 141, second boss portion 142, plate portion 101, collar portion 106 and upper hanger portion 22, and is configured to be fastenable from outside of the pair of down tubes 9.

As shown in FIG. 5, the pair of down tubes 9, cross-member 9a and upper suspension portion 112 thereby form a rectangular rigid body in a front view. As a result, it is possible to make the upper hanger portion 22 of the engine 20 contribute to an improvement in the rigidity of the chassis frame 5.

As shown in FIGS. 3 to 6, the lower suspension portion 124 suspends the engine 20, by way of fastening the plate portions 101 and lower hanger portion 23. More specifically, the lower suspension portion 124 includes the plate portions 101, the lower hanger portion 23 abutting the plate portions 101, the lower hanger bolt 126, and the nut 126a threading to the lower hanger bolt 126. The lower hanger bolt 126 is arranged to penetrate in the vehicle width direction through the plate portions 101 and the lower hanger portion 23, and is configured to be fastenable directly from outside of the plate portions 101. A leading end of the lower hanger bolt 126 is fastened by the nut 126a.

The upper suspension portion 112 and lower suspension portion 124 configured in the above way are disposed linearly along a direction in which the down tube 9 extends in a side view, as shown in FIG. 4.

In addition, the upper suspension portion 112 and lower suspension portion 124 are respectively disposed above and below the crankshaft 26 in a side view, as shown in FIG. 4.

The bent part 111 of the plate portion 101 is formed at a part of the plate portion 101 between the upper suspension portion 112 and the lower suspension portion 124, and bends so as to project forwards relative to a line 135a linking the upper suspension portion 112 and the lower suspension portion 124.

Next, the rear suspension portion 130 will be explained while referencing FIG. 4. As shown in FIG. 4, the rear suspension portion 130 is configured to include a pair of engine-hanger upper stays 132, and a fastening bolt 133 and nut 133a (refer to FIG. 6) that threads to this fastening bolt 133. An upper part of the rear portion of the engine 20 is fastened by way of the fastening bolt 133 and nut 133a to the engine-hanger upper stays 132. The rear suspension portion 130 thereby suspends the upper part of the rear portion of the engine 20.

The crankshaft 26 is disposed within a region 135 of triangular shape formed by linking the upper suspension portion 112, lower suspension portion 124 and rear suspension portion 130 in a side view, as shown in FIG. 4. The region 135 of triangular shape is configured from the three lines 135a, 135b and 135c. The line 135a is a line linking the upper suspension portion 112 and the lower suspension portion 124. The line 135b is a line linking the upper suspension portion 112 and the rear suspension portion 130. The line 135c is a line linking the lower suspension portion 124 and the rear suspension portion 130.

As described earlier, the subframes 9b, 9c, 9d and 9e (refer to FIG. 4) are provided between the down tubes 9 and main frames 7, and form a trellis structure. As shown in FIG. 4, the line 135b configuring the region 135 is substantially parallel to the subframe 9c. In addition, the line 135c configuring the region 135 is substantially parallel to the subframe 9e. Therefore, according to this suspension structure of the engine 20, the engine 20 itself can strengthen the longitudinal stiffness of the chassis frame 5, similarly to the subframes 9c and 9e.

In addition, the fastening bolt 118 and nut 118a are provided above the upper suspension portion 112 as fastening portions to fasten the upper ends of the plate portions 101 and the second boss portions 142 of the down tubes 9. The fastening bolt 118 is inserted into the second boss portion 142 and the through hole 107 of the plate portion 101, and threads to the welded nut 104 of the plate portion 101. The upper end of the plate portion 101 is thereby fastened to the down tube 9.

The cover-member fastening stay 146 is provided between the fastening bolt 118 fastened to the plate portion 101 and the upper suspension portion 112. The cover-member fastening stay 146 is a metallic member that fastens the inner cowl 92, which serves as a cover member that covers a lateral side of the chassis. The cover-member fastening stay 146 is made so as to be fastened to the plate portion 101 by the bolt 148 and nut 149. The bolt 148 is inserted into the through hole 109 of the plate portion 101. Then, the nut 149 is threaded to the leading end of the bolt 148.

Each of the effects indicated below is exerted according to the motorcycle 1 of the present embodiment explained in the foregoing.

The motorcycle 1 of the present embodiment includes the chassis frame 5; the engine 20 having the hanger portion 21; the pair of down tubes 9; the engine hanger brackets 100 having the plate portions 101 and collar portions 106, and joining the pair of down tubes 9 with the hanger portion 21; the upper suspension portion 112; and the lower suspension portion 124. The upper suspension portion 112 suspends the engine 20 by way of fastening the down tubes 9, plate portions 101, collar portions 106 and upper hanger portion 22 in a state arranged linearly in the vehicle width direction. The lower suspension portion 124c suspends the engine 20 by way of fastening the plate portions 101 and the lower hanger portion 23.

The upper suspension portion 112 suspends the engine 20 by way of fastening the down tubes 9, plate portions 101, collar portions 106 and upper hanger portion 22 in a state arranged linearly in the vehicle width direction. As a result, it is possible to raise the rigidity (lateral stiffness) of the chassis frame 5 in the vehicle width direction.

In addition, the lower suspension portion 124 suspends the engine 20 by way of directly fastening the plate portions 101 and the lower hanger portion 23. As a result, it is possible to directly support the weight of the engine 20, whereby the support stiffness of the engine 20 can be raised. Therefore, it is possible to achieve a weight reduction by improving the rigidity of the chassis frame 5 and the support stiffness of the engine 20 by distributing with the upper suspension portion 112 and the lower suspension portion 124.

In addition, since the lower suspension portion 124 has few components compared to the upper suspension portion 112, it is possible to configure the vehicle width to be compact. As a result, it is possible to reduce the weight of a lower portion of the engine 20, whereby centralization of the mass can be achieved.

In addition, in the motorcycle 1 of the present embodiment, the upper suspension portion 112 includes the first boss portions 141 and second boss portions 142, the plate portions 101, the collar portions 106, the upper hanger portion 22, the pair of down tubes 9, and the upper hanger bolt 114. The upper hanger bolt 114 is arranged to penetrate through the boss portions 141, 142, plate portions 101, collar portions 106 and upper hanger portion 22 in the vehicle width direction, and is configured to be fastenable from outside of the pair of down tubes 9.

As a result, the boss portions 141, 142, the plate portions 101, the collar portions 106 and the upper hanger portion 22 arranged in the vehicle width direction between the pair of down tubes 9 can be fastened from outside of the down tubes 9 by the upper fastening member. The engine 20 serving as a rigid member can thereby be configured interposing the down tubes 9. Therefore, the rigidity of the engine 20 can be effectively used in the improvement of the rigidity of the chassis frame 5.

In addition, the motorcycle 1 of the present embodiment further includes the head pipe 6 that forms a part of the chassis frame 5 and supports the front forks 3 to be rotatable. The down tubes 9 extend linearly from the head pipe 6 downwards. The upper suspension portion 112 and the lower suspension portion 124 are disposed linearly along the direction in which the down tube 9 extends in a side view.

As a result, it is possible to group the load direction upon supporting the engine 20 by the upper suspension portion 112 and the lower suspension portion 124 into the direction in which the down tube 9 extends. Therefore, it is possible to improve the rigidity balance of the chassis frame 5, whereby the load of the engine 20 can be supported with a light-weight structure.

In addition, in the motorcycle 1 of the present embodiment, the fastening bolts 118 to fasten the plate portions 101 and down tubes 9 are provided above the upper suspension portion 112. As a result, the rotational load acting on the plate portion 101 about the upper suspension portion 112 can be received by the fastening bolts 118. Therefore, the support stiffness of the engine 20 can be further raised.

In addition, in the motorcycle 1 of the present embodiment, the cover-member fastening stays 146 to fasten the inner cowl 92 are provided between the fastening bolts 118 of the plate portions 101 and the upper suspension portion 112. As a result, it is possible to raise the mounting strength of the inner cowl 92.

Furthermore, the motorcycle 1 of the present embodiment further includes the rear suspension portion 130. The upper suspension portion 112 and the lower suspension portion 124 are respectively disposed above and below the crankshaft 26 in a side view. The crankshaft 26 is disposed within the region 135 of a triangular shape formed by linking the upper suspension portion 112, the lower suspension portion 124 and the rear suspension portion 130 in a side view.

As a result, it is possible to appropriately set the support load of the engine 20 at the upper suspension portion 112, the lower suspension portion 124 and the rear suspension portion 130, by arranging the upper suspension portion 112, the lower suspension portion 124 and the rear suspension portion 130 with reference to the crankshaft 26, which is heavy among the components of the engine 20. Therefore, optimization of the suspension positions of the engine 20 can be achieved. A weight reduction can be achieved for the upper suspension portion 112, the lower suspension portion 124, the rear suspension portion 130 and the chassis frame 5. In addition, the engine 20 can be made to contribute to an improvement in the rigidity of the chassis frame 5.

Furthermore, in the motorcycle 1 of the present embodiment, a part of the plate portion 101 between the upper suspension portion 112 and the lower suspension portion 124 bends so as to project forwards relative to the line 135a linking the upper suspension portion 112 and the lower suspension portion 124 in a side view.

The main load acting on the lower suspension portion 124 is the tensile force from the weight of the engine 20. As a result, the bent part 111 of the plate portion 101 can sufficiently exhibit a function for raising the support stiffness of the engine 20. Therefore, it is possible to achieve a size reduction by providing the bent part 111 of the plate portion 101 to curb the projecting amount to match the shape of the engine 20.

Although an embodiment of the present invention has been explained in the foregoing, the present invention is not to be limited to the aforementioned embodiment, and modifications thereto are possible as appropriate.

For example, although the plate portion 101 of the engine hanger bracket 100 has been explained as being formed in a substantially wide-V shape in a side view, and having the bent part 111 that bends to project forwards, it is not limited thereto. The engine hanger bracket 100 may be configured so that the plate portion 101 is a linear shape as a whole.

The invention claimed is:

1. A motorcycle comprising:
    a chassis frame;
    an engine having a hanger portion that is suspended from the chassis frame;
    a pair of down tubes in a vehicle width direction that fauns a part of the chassis frame, and extends downwards at a front portion of the chassis frame; and
    an engine hanger bracket having a plate portion formed in a plate shape and a collar portion provided to the plate portion, and joining the pair of down tubes with the hanger portion,
    wherein the hanger portion includes an upper hanger portion and a lower hanger portion that are respectively disposed one above the other in a height direction of the engine, and
    wherein the motorcycle further comprises:
    an upper suspension portion that suspends the engine by way of fastening the down tube, the plate portion, the collar portion and the upper hanger portion in a state arranged linearly in a vehicle width direction; and
    a lower suspension portion that suspends the engine by way of fastening the plate portion and the lower hanger portion.

2. The motorcycle according to claim 1, wherein the upper suspension portion includes:
    a boss portion provided at the down tube;
    the plate portion abutting the boss portion;
    the collar portion fixed to the plate portion;
    the upper hanger portion abutting the collar portion; and
    an upper fastening member that is disposed to penetrate the pair of down tubes, the boss portion, the plate portion, the collar portion and the upper hanger portion in a vehicle width direction, and is configured to be fastenable from outside of the pair of down tubes.

3. The motorcycle according to claim 1, further comprising a head pipe that forms a part of the chassis frame, and retains a steering device of a front wheel to be rotatable,
    wherein the down tube extends downwards linearly from the head pipe, and
    wherein the upper suspension portion and the lower suspension portion are disposed linearly along a direction in which the down tube extends.

4. The motorcycle according to claim 1, wherein a fastening portion to fasten the plate portion and the down tube is provided above the upper suspension portion.

5. The motorcycle according to claim 4, wherein a cover-member fastening stay to fasten a cover member that covers a lateral side of a chassis is provided between the fastening portion of the plate portion and the upper suspension portion.

6. The motorcycle according to claim 1, further comprising a rear suspension portion that suspends the engine, by way of fastening a rear portion of the engine having a crankshaft extending in the vehicle width direction, and an engine hanger stay that is provided at a substantially central part of the chassis frame in a front-rear direction and supports the rear portion of the engine,
    wherein the upper suspension portion and the lower suspension portion are respectively disposed above and below the crankshaft in a side view, and
    the crankshaft is disposed within a region of triangular shape formed by linking the upper suspension portion, the lower suspension portion, and the rear suspension portion in a side view.

7. The motorcycle according to claim 1, wherein a part of the plate portion between the upper suspension portion and the lower suspension portion bends so as to project forwards relative to a line linking the upper suspension portion and the lower suspension portion in a side view.

* * * * *